(12) United States Patent
Repice et al.

(10) Patent No.: US 6,788,961 B2
(45) Date of Patent: Sep. 7, 2004

(54) PRIMARY CONTROL SIGNAL BUS SELECTION FOR RADIO HEADS BASED ON PROPAGATION DELAY

(75) Inventors: Joseph A. Repice, Apex, NC (US); Johnny D. Shepherd, Hillsborough, NC (US)

(73) Assignee: Ericsson Inc., Research Triangle Park, NC (US)

(*) Notice: Subject to any disclaimer, the term of this patent is extended or adjusted under 35 U.S.C. 154(b) by 513 days.

(21) Appl. No.: 09/963,750

(22) Filed: Sep. 26, 2001

(65) Prior Publication Data

US 2003/0061422 A1 Mar. 27, 2003

(51) Int. Cl.⁷ ............................................. H04B 1/38
(52) U.S. Cl. .................... 455/560; 455/561; 455/455; 455/67.16; 370/238
(58) Field of Search .............................. 455/445, 560, 455/561, 67.16; 370/238

(56) References Cited

U.S. PATENT DOCUMENTS 6,034,946 A * 3/2000 Roginsky et al. .......... 370/238
6,628,968 B1 * 9/2003 Grohn ........................ 455/560
2002/0080901 A1 * 6/2002 Ham, III .................... 375/376
2003/0081568 A1 * 5/2003 Shepherd ................... 370/329

* cited by examiner

*Primary Examiner*—Vivian Chin
*Assistant Examiner*—Minh D. Dao
(74) *Attorney, Agent, or Firm*—Coats & Bennett, P.L.L.C.

(57) ABSTRACT

The selection of the primary control signal bus to use for a given radio head is based on propagation delay to the relevant radio head. A plurality of radio heads are cascaded in a chain with buffered error correction therebetween. At least first and second control interfaces connect to the chain and supply control information thereto via respective control signal busses, which may be virtual busses. The propagation delay from a first control interface to a first radio head over a first bus is determined. Likewise, the propagation delay from a second control interface to the first radio head over a second bus is determined. Thereafter, the radio head determines which control signal bus to select as its primary control signal bus based on the respective propagation delays between the first radio head and the first and second control interfaces.

26 Claims, 5 Drawing Sheets

FIG. 5

PRIMARY CONTROL SIGNAL BUS SELECTION FOR RADIO HEADS BASED ON PROPAGATION DELAY

BACKGROUND OF THE INVENTION

The present invention relates to wireless communications, and more particularly to the selection of a primary control signal bus for cascaded radio heads that have buffered communications links between radio heads.

In today's wireless communications environment, it is not uncommon to have localized wireless telephone systems, such as might be installed in a building or on a campus, that are designed to cover a relatively small geographic area. A typical physical configuration of such a localized system includes a central cabinet connected to a plurality of radio heads. The central cabinet (located at the site/premises) includes regional processors and signaling terminals (also known as "control interfaces" or "control interface units") that oversee communications with the relevant Mobile Switching Center (MSC) and with the corresponding regional processors. The signaling terminals communicate with the regional processors over two or more control signal buses within the control cabinet. The regional processors in turn communicate with the radio heads, typically over a suitable T1 or E1 link. The radio heads are typically arranged in a cascaded fashion, forming a chain of radio heads, with only the end radio heads of the chain directly connected to the central cabinet.

Typically, each radio head in the chain is physically located a substantial distance from the next radio head, such as up to 1000 meters apart. Because of this physical separation, it is common to employ error detection and correction schemes to the transmissions between the successive radio heads. Use of such error correction schemes means that data from the central cabinet to a given radio head, say the third radio head, is buffered at the central cabinet for error correction purposes, sent to the first radio head in the chain, buffered again at the first radio head for error correction, sent to the second radio head, and buffered yet again at the second radio head for error correction, before being sent to the third radio head. There can thus be a significant time delay between the central cabinet sending the information and its receipt at the desired radio head. This time delay, sometimes referred to herein as a propagation delay, is generally a function of the error detection and correction schemes employed, the processing speed of the relevant processor(s), the distance between radio heads, and the number of "hops" between the central cabinet and the desired radio head.

When installing (or removing) radio heads in a localized system described above, it is necessary to decide which control signal bus each regional processor should consider as its primary bus. Generally, this means that the responsible technician must perform some function that assigns each regional processor to one of the plurality of control signal buses; typically, this involves assigning the regional processor to bus A or bus B based on the physical positioning of the corresponding regional processing board within the central cabinet. Because there is generally a one-to-one relationship between regional processors and radio heads, with a given regional processor controlling a given radio head, this results in the radio heads being effectively assigned to bus A or bus B based on the location of the corresponding regional processing board within the control cabinet. However, such bus assignments sometimes result in unnecessarily long propagation delays for a given radio head.

BRIEF SUMMARY OF THE INVENTION

According to the present invention, selection of the primary control signal bus to use for a given radio head is based on propagation delay to the relevant radio head. A wireless communications system may include a plurality of radio heads cascaded in a chain and at least first and second control interfaces connected to the chain and supplying control information thereto. The communications between radio heads employ buffered error correction, resulting in store-and-forward propagation delay. A plurality of virtual control signal busses are established connecting the control interfaces to the plurality of radio heads, including at least a first virtual bus connecting the first control interface to the plurality of radio heads and a second virtual bus connecting the second control interface to the plurality of radio heads. The propagation delay from the first control interface to a first radio head over the first virtual bus is determined. Likewise, the propagation delay from the second control interface to the first radio head over the second virtual bus is determined. Thereafter, the first radio head determines which control signal bus, from amongst a plurality of virtual busses, to select as its primary control signal bus based on the respective propagation delays between the first radio head and the first and second control interfaces.

DETAILED DESCRIPTION OF THE INVENTION

The present invention takes a different approach to control signal bus assignment over prior art methods, such that the control signal bus selection is based on propagation delay to the relevant radio head. In order to aid in understanding the context of the present invention, the discussion below will begin with a brief overview of an entire communications system before focusing on a Localized Wireless Telephone System, where radio heads are typically found.

Figure 1:
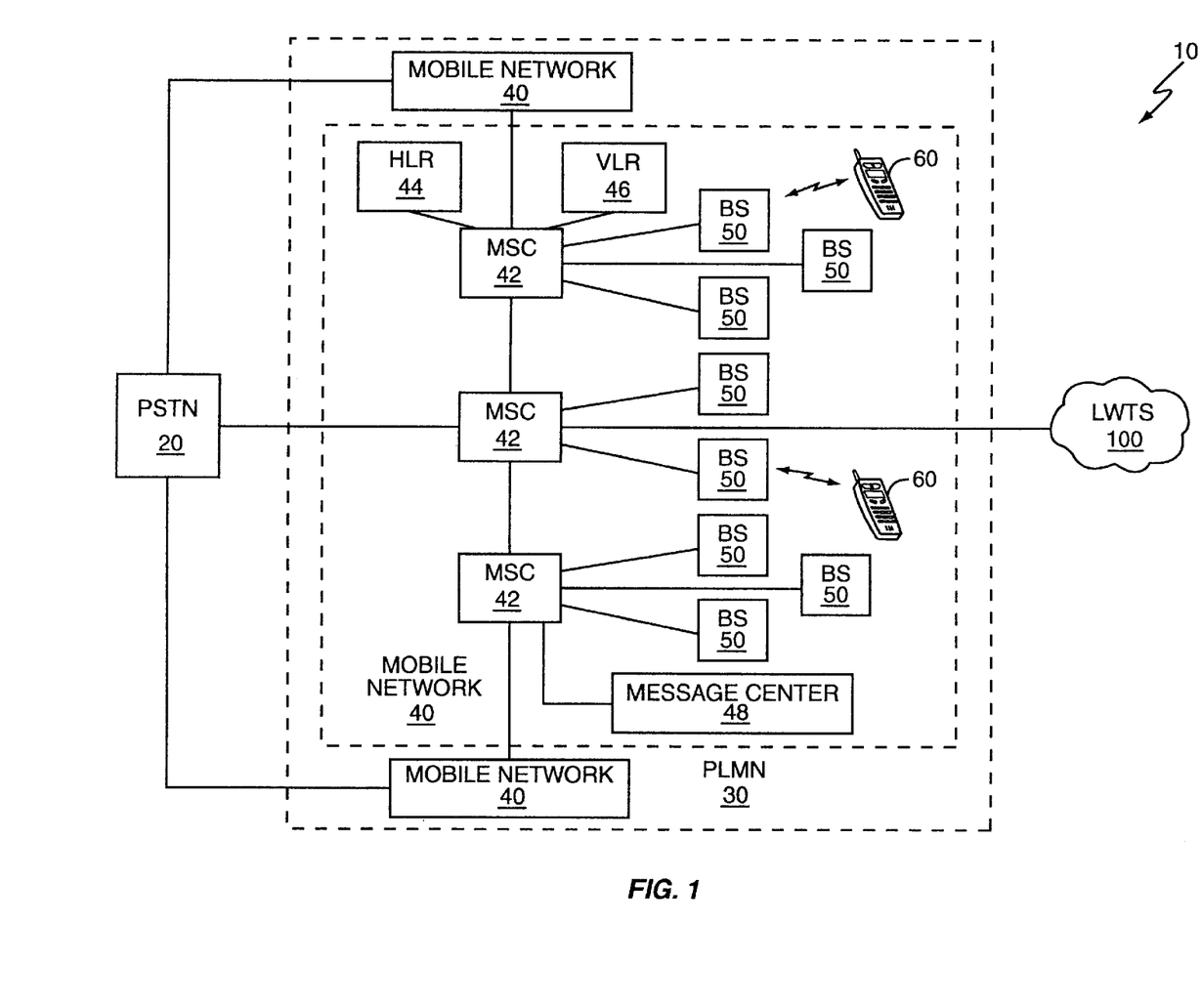
FIG. 1 shows a wireless communications system, including a localized wireless telephone system.

Turning now to FIG. 1, a communication system 10 is illustrated. In particular, the communications system 10 includes the Public Switched Telephone Network (PSTN) 20 and the Public Land Mobile Network (PLMN) 30, which may, in turn, be connected to one or more Localized Wireless Telephone Systems (LWTS) 100. While not shown, satellites may be used as needed either within the PSTN 20 or the PLMN 30 to provide remote communication links, such as across oceans or the like.

The operation of the PSTN 20 is well established and subject to extensive documentation beyond the scope of the present invention and therefore a more detailed discussion is omitted.

PLMN 30 may include a plurality of proprietary mobile networks 40, and each mobile network 40 may include a plurality of Mobile Switching Centers (MSC) 42. Typically, at least one MSC 42 in the PLMN 30, and more advantageously one MSC 42 in each mobile network 40, is connected via a gateway to the PSTN 20. Some MSCs 42 may also serve as gateways connecting the various mobile networks 40 within the PLMN 30. Gateway functions may be all consolidated at a single MSC 42 within a mobile network 40 or dispersed amongst a plurality of MSCs 42 within a mobile network 40 as needed or desired. Typically, at least one MSC 42 within a particular mobile network 40 connects to, or includes, a Home Location Register (HLR) 44 and a Visitor Location Register (VLR) 46, whose functions are well known in the art. Additionally, each mobile network 40 may be equipped with a message center 48 communicatively connected to an MSC 42 for handling short message service and the like. Each MSC 42 may further be communicatively connected to a plurality of base stations 50. Each base station 50 may communicate with one or more mobile terminals 60 over appropriate RF communications channels, as is well known in the art.

The LWTS 100 is a wireless telecommunications system designed to cover a relatively small geographic area, such as a building or a campus, to provide public or private wireless communications services. Just by way of example, the LWTS 100 may be used to provide wireless service inside buildings where the RF signals from the PLMN 30 may be inadequate and/or installed to allow employees working in the building or on the campus to use a mobile terminal 60 as an office telephone. LWTS 100 typically connects with an MSC 42 in the PLMN 30 to allow subscribers of the LWTS 100 to move seamlessly between the LWTS 100 and the PLMN 30. The MSC 42 responsible for a LWTS 100 may treat the LWTS 100 merely as another base station 50 or a plurality of base stations 50 depending on the internal structure of the LWTS 100 in question. One of many physical configurations of a LWTS 100 is shown in more detail in FIG. 2.

Figure 2:
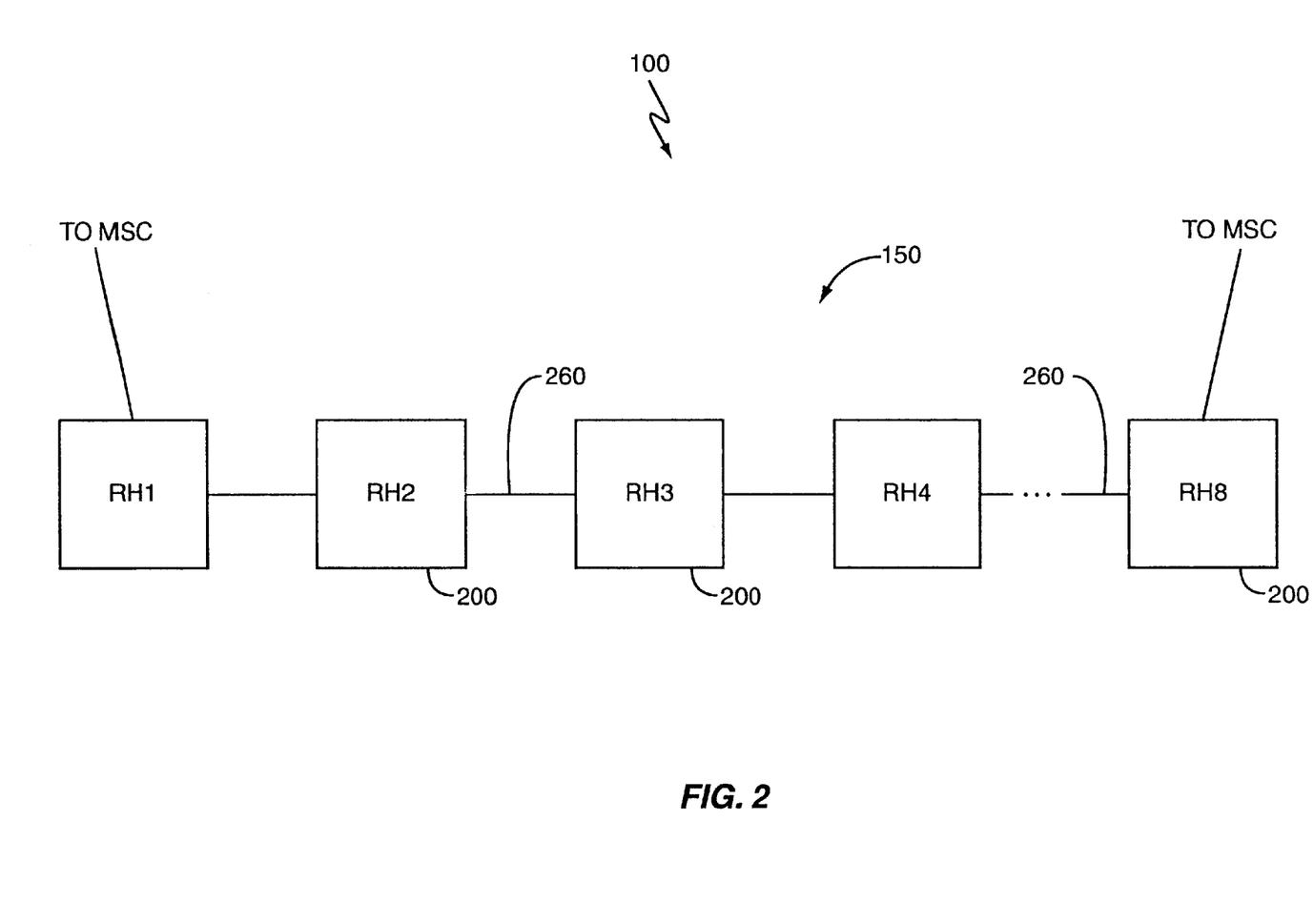
FIG. 2 shows one possible physical configuration of a localized wireless telephone system according to the present invention.

The LWTS 100 of FIG. 2 includes a plurality of radio heads 200 connected in a chain 150, with the end radio heads RH1,RH8 connected to an MSC 42. The physical connections between the various radio heads 200 may take the form of a T1/E1 line 260, typically with pulse code modulation, as is known in the art. The physical connections between the end radio heads RH1,RH8 and the MSC 42 may also take the form of a T1/E1 line. In some arrangements of the present invention, each radio head 200 may have three conceptual parts—a control interface 210, a regional processor 220, a transceiver circuit 240, and a device processor 230 that controls the transceiver circuit 240 and its communications with the regional processor 220. See FIG. 3. In radio heads RH1 and RH8, the control interface 210 is enabled and handles the communications with the MSC 42 in a known fashion. In radio heads RH2-RH7, the unused control interfaces 210 may be disabled to conserve power, as they are unnecessary. The regional processors 220 of each radio head 200, and the respective device processors 230 and transceivers 240, are enabled. The functioning of the hierarchical processor structure (regional processors 220 and device processors 230) and the transceivers 240 is well known in the art, and detailed understanding thereof is not necessary for understanding the present invention.

The radio heads 200 of the chain 150 may be physically separated by a substantial amount, such as up to 1000 meters. Due to this distance between the radio heads 200, or for other reasons, it is common to employ error detection and correction schemes (sometimes referred to herein as "error correction" for simplicity). For example, the communications between radio heads 200 may be Link Access Procedure-D Channel error coded. The use of most error correction schemes in cascaded communications leads to so called store-and-forward delay, basically as a result of the processing required to detect and correct any errors at each "hop" in the communications chain 150. In addition, the physical distances between the radio heads 200 may cause some transmission delays. The combination of the store-and-forward delays and the transmission delays may be referred to herein as propagation delay. Assuming identical processors at each radio head 200 and identical coding schemes for each link, the propagation delay for signals from RH8 to RH2 will be longer than the propagation delay for signals from RH1 to RH2.

Figure 3:
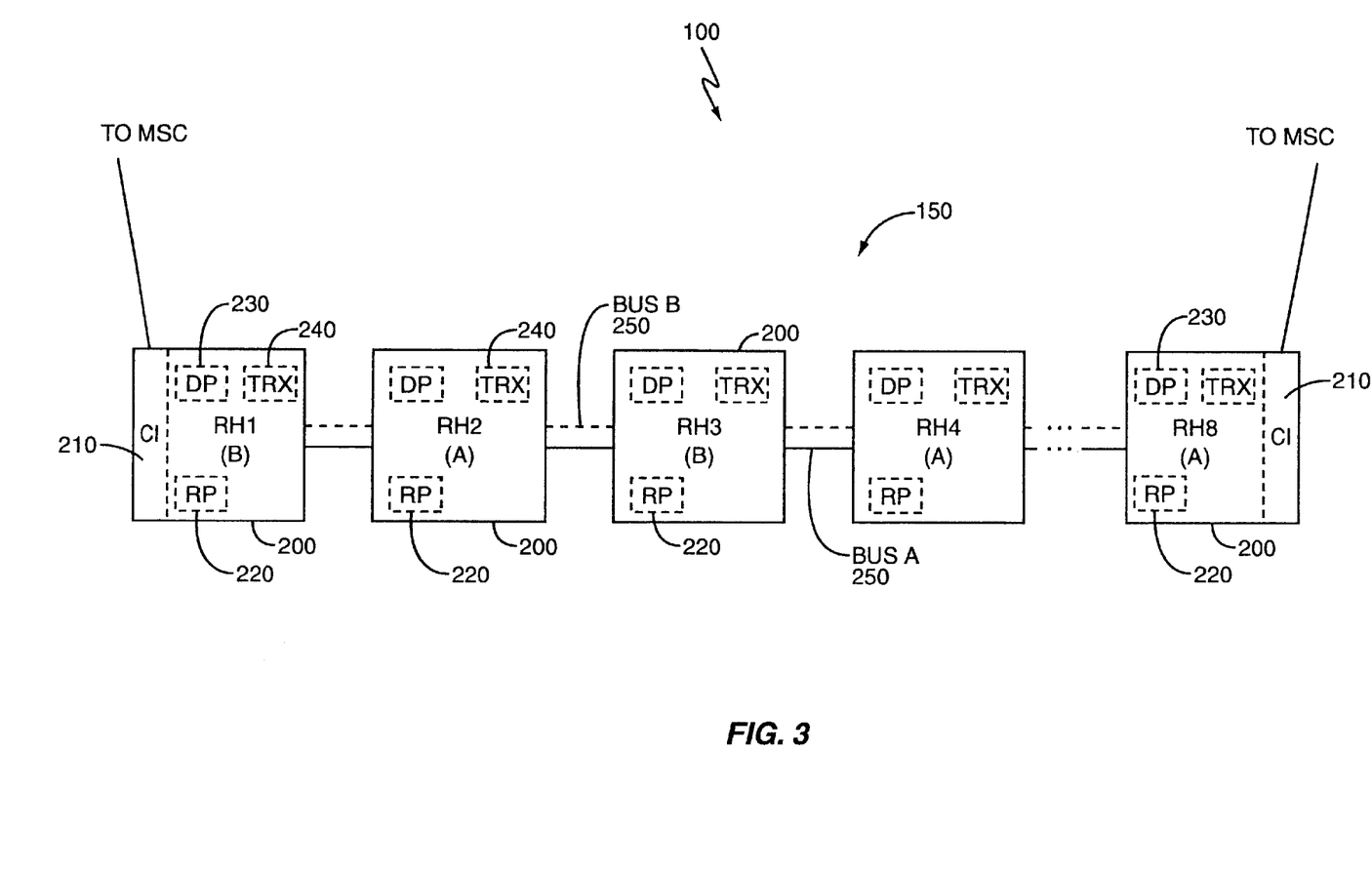
FIG. 3 shows one possible control signal bus assignment architecture.

While FIG. 2 shows a single physical transmission line 260 (e.g., a T1/E1 coaxial cable or "category five" UTP) between each radio head 200, this line may contain several channels through the use of multiplexing (e.g., time division multiplexing or the like). Two of these channels may be used as control signal buses 250, as is known in the art. This is graphically shown in FIG. 3, where the solid line represents bus A, while the dashed line represents bus B. Because these buses 250 are logically distinct, but share some physical components, they are sometimes referred to as "virtual buses." Virtual bus A operates under the control of control interface A in radio head RH8, while virtual bus B operates under the control of control interface B in radio head RH1. FIG. 3 shows the radio heads 200 connected such that each radio head 200 is connected to both virtual bus A and virtual bus B. However, each radio head 200 has only one primary control signal bus 250, with the alternate bus being used only as a backup in case the primary bus fails.

FIG. 3 shows one possible primary control signal bus assignment architecture, where the odd numbered radio heads (RH1, RH3, RH5, RH7) use bus B as their primary bus, while the even numbered radio heads (RH2, RH4, RH6, RH8) use bus A as their primary bus. The conrol bus assignments are indicated by the letter A or B within parentheses. Under such an arrangement, the control information for radio head RH2 must travel through RH8, RH7, RH6, RH5, RH4, and RH3 before reaching RH2. Thus, each message for RH2 from RH8 would have to travel through six links between radio heads before reaching RH2. In the art, this path is said to have six "hops." In contrast, the path from RH1 to RH2 is only one "hop."

If the control information being sent to RH2 is time-critical control information, the propagation delays associated with use of control bus A (routing through RH8) may, in some situations, result in the information not arriving in sufficient time to be properly processed. However, because the propagation delay associated with use of control bus B (routing through RH1) may be much less, the time-critical information has a better chance of arriving in time. In addition, the routing on bus B may be less prone to errors, as there are less "hops" to RH2 on bus B.

Accordingly, the present invention contemplates that primary assignment of one or more radio heads 200 to the respective control signal buses 250 be based on the propagation delay between the respective control interfaces 210 and the respective radio heads 200. The overall process may be seen in the flowchart of FIG. 4. The selection of primary control bus may be triggered by the "definition" of a radio head associated with the addition or deletion of a radio head from the radio head chain 150 (box 310). Of course, other events may also trigger such selection, such as initial installation, a change in error coding employed at a given radio head, and the like, or as a simple maintenance operation. After being triggered, the propagation delay between each control interface 210 and each radio head 200 is automatically determined (box 320). This may be accomplished by each control interface 210 pinging a radio head 200 on its associated bus 250 and noting the time elapsed until a response is received. Alternatively, the control interface 210 may use some other measure of propagation delay, such as counting the number of "hops" between itself and the radio head 200 of interest. A table is then created, listing the various propagation delays to each radio head 200 for the various virtual buses 250 (box 330). The listing of propagation delays may be in units of time, or in other units, such as "hops", or some other related metric, such as a normalized scale value. There may be one table for each control interface 210, or there may be a combined table. The table(s) is then distributed to the regional processors 220 of each radio head 200 (box 340). Each radio head 200 then determines which bus 250 provides the shortest propagation delay to/from a control interface 210 (box 350). The primary bus 250 for that radio head 200 is then assigned based on that determination (box 360).

Figure 4:
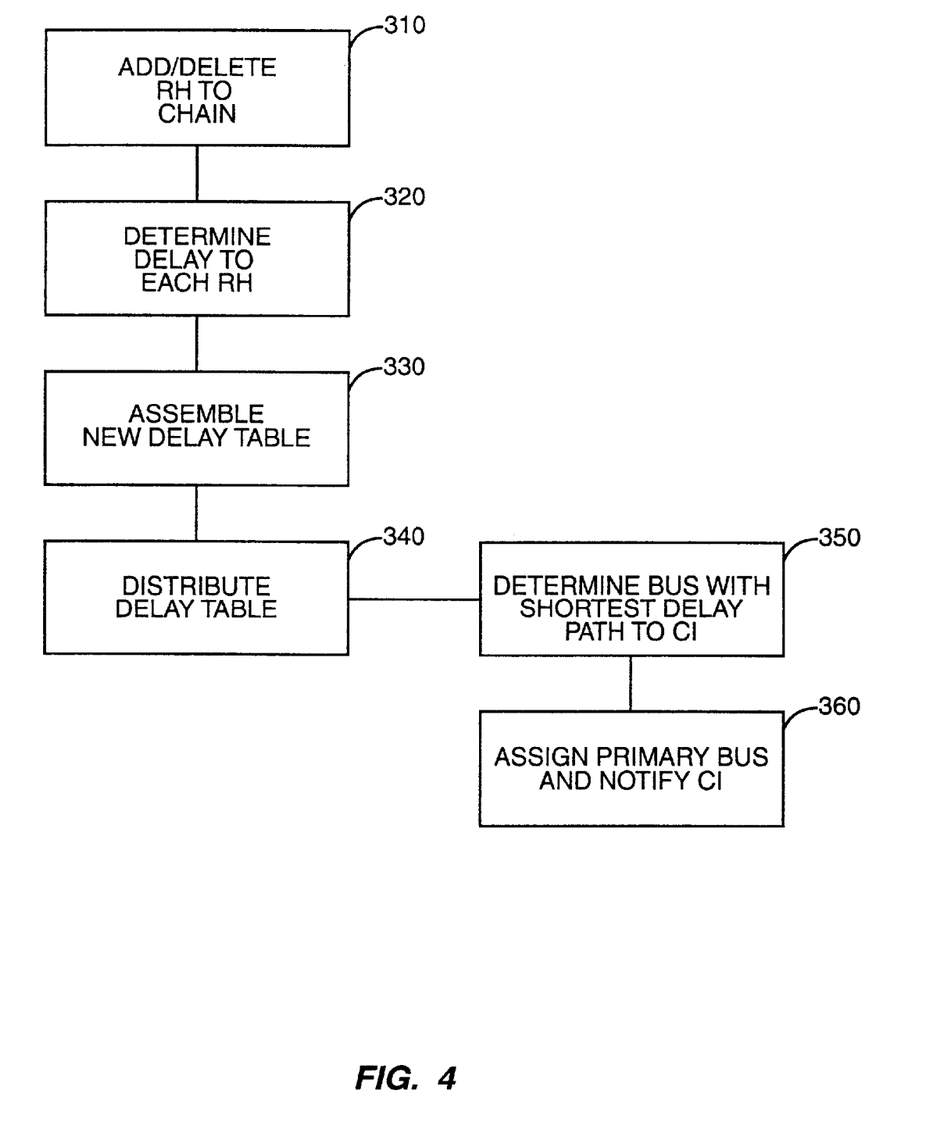
FIG. 4 shows a simplified flowchart of one process according to the present invention.
Figure 5:
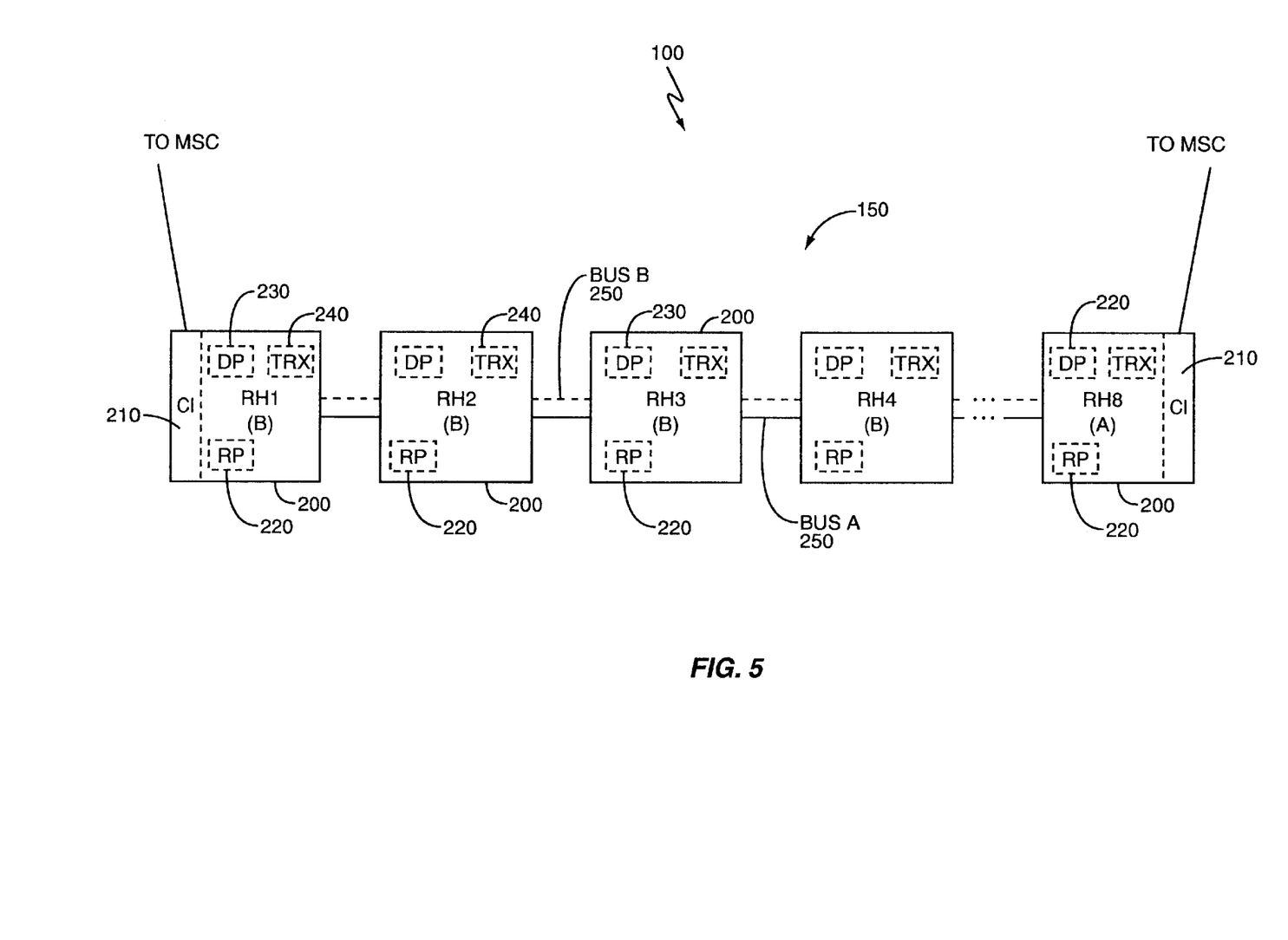
FIG. 5 shows a more detailed view of the system of FIG. 2, including a control signal bus architecture according to the present invention.

Applying the primary control signal bus selection logic of FIG. 4 results in the bus assignments shown in FIG. 5, where the control bus assignments are indicated by the letter A or B within parentheses. Assuming that the radio heads 200 employ the same error correction schemes, have the same processing speed, and that the distance between radio heads 200 is roughly similar, then the propagation delay between the respective control interfaces 210 and each radio head 200 in FIG. 5 should be proportional to the number of "hops" between that control interface 210 and the radio head 200. While these assumptions may overlook real world variances, it is nonetheless useful for demonstrating the present invention. Under these conditions, application of the logic of FIG. 4 results in radio heads RH1, RH2, RH3, and RH4 deciding, based on the associated propagation delays, to select bus B as their primary control signal bus, while radio heads RH5-RH8 chose bus A as their primary control signal bus. This arrangement is shown in FIG. 5. Thus, according to the present invention, control information may be supplied to radio head RH2 about six times faster than under the approach of FIG. 3. Of course, if the primary bus fails, then a secondary bus, such as the un-selected bus, may be used to send information to a radio head 200, but additional propagation delays would be encountered in this backup mode.

The discussion above has focused on a chain 150 of eight radio heads 200, with two possible control signal buses 250; however, such is not required and the present invention contemplates any plurality of radio heads 200 and any plurality of possible control buses 250. Further, as the present invention solves a problem associated with propagation delay of any sort, not just geographic separation induced propagation delay, some or all of the radio heads 200 in the radio head chain 150 may be essentially co-located if desired without departing from the present invention.

The disclosures of U.S. patent application Ser. Nos. 09/690,258 and 09/705,093, commonly assigned, are incorporated herein by reference.

The present invention may, of course, be carried out in other specific ways than those herein set forth without departing from the scope of the invention. The present embodiments are, therefore, to be considered in all respects as illustrative and not restrictive, and all changes coming within the meaning and equivalency range of the appended claims are intended to be embraced therein.

What is claimed is:

1. A method implemented in a radio head of selecting a control signaling bus from a plurality of available control signaling busses, said method comprising:

determining propagation delays along at least two of said control signaling busses from a corresponding control interface to a first radio head;

automatically selecting, by said first radio head, a primary control signaling bus from amongst said plurality of available control signaling busses based on said propagation delays;

forming a cascaded radio head chain comprising said first radio head and said at least two control signaling busses prior to said determining propagation delays;

subsequently changing the physical configuration of said radio head chain;

thereafter, re-determining the propagation delays alone said at least two control signaling busses from said corresponding control interfaces to said first radio head; and thereafter, automatically re-selecting, by said first radio head, a primary control signaling bus from amongst said plurality of available control signaling busses based on said re-determined propagation delays.

2. The method of claim 1 wherein changing the physical configuration of said system comprises adding or subtracting at least one radio head to/from said radio head chain.

3. The method of claim 1 wherein determining said propagation delays along said at least two of said control signaling busses from said corresponding control interface to said first radio head comprises determining said propagation delays from said control interfaces to said first radio head by counting hops along said control signaling busses between said corresponding control interfaces and said first radio head.

4. The method of claim 1 wherein determining said propagation delays along said at least two of said control signaling busses from said corresponding control interface to said first radio head comprises determining said propagation delays from said control interfaces to said first radio head by measuring a ping-response time along said control signaling busses between said corresponding control interfaces and said first radio head.

5. A method of operating a wireless communications system, said system comprising a plurality of physically separated radio heads cascaded in a chain and at least first and second control interfaces connected to said chain and supplying control information thereto via a plurality of virtual control signal busses connecting said control interfaces to said plurality of radio heads, including at least a first virtual control signal bus connecting said first control interface to said plurality of radio heads and a second virtual control signal bus connecting said second control interface to said plurality of radio heads, said method comprising:

determining the propagation delay from said first control interface to a first radio head over said first virtual control signal bus;

determining the propagation delay from said second control interface to said first radio head over said second virtual control signal bus; and determining, by said first radio head, a primary control signal bus from amongst said plurality of virtual control signal busses based on said respective propagation delays between said first radio head and said control interfaces.

6. The method of claim 5 further comprising subsequently:

changing the physical configuration of said system;

thereafter, re-determining the propagation delay from said first control interface to said first radio head over said first virtual control signal bus and re-determining the propagation delay from said second control interface to said first radio head over said second virtual control signal bus; and thereafter, re-determining, by said first radio head, a primary control signal bus from amongst said plurality of virtual control signal busses based on the respective propagation delays between said first radio head and said control interfaces.

7. The method of claim 6 wherein changing the physical configuration of said system comprises adding or subtracting at least one radio head to/from said chain.

8. The method of claim 5 wherein determining the propagation delay from said first control interface to said first radio head over said first virtual control signal bus comprises determining a first propagation delay from said first control interface to said first radio head over said first virtual control signal bus by said first control interface.

9. The method of claim 8 wherein said first control interface determining said first propagation delay from said first control interface to said first radio head over said first virtual control signal bus comprises said first control interface determining said first propagation delay by counting hops between said first control interface and said first radio head.

10. The method of claim 8 wherein said first control interface determining said first propagation delay from said first control interface to said first radio head over said first virtual control signal bus comprises said first control interface determining said first propagation delay by measuring a ping-response time between said first control interface and said first radio head over said first virtual control bus.

11. The method of claim 8 further comprising said first control interface communicating said first propagation delay to said first radio head.

12. The method of claim 5 wherein determining the propagation delay from said first control interface to said first radio head over said first virtual control signal bus comprises said first control interface determining respective propagation delays from said first control interface to a plurality of radio heads over said first virtual control signal bus.

13. The method of claim 12 further comprising said first control interface communicating said plurality of propagation delays to said first radio head.

14. The method of claim 13 wherein determining the propagation delay from said second control interface to said first radio head over said second virtual control signal bus comprises said second control interface determining a second propagation delay from said second control interface to said first radio head over said second virtual control signal bus, and further comprising said second control interface communicating said second propagation delay to said first radio head.

15. A method of operating a wireless communications system, said system comprising a plurality of radio heads cascaded in a chain with buffered error correction therebetween and at least first and second control interface units connected to said chain and supplying control information thereto via a plurality of control signal busses connecting said control interface units to said plurality of radio heads, said method comprising:

determining the propagation delay from a first control interface unit to a first radio head over a first control signal bus;

determining the propagation delay from a second control interface unit to said first radio head over a second control signal bus; and selecting, by said first radio head, a primary control signal bus from amongst said plurality of control signal busses based on the respective propagation delays between said first radio head and said first and second control interface units.

16. The method of claim 15 wherein determining the propagation delay from said first control interface unit to said first radio head over said first bus comprises determining, by said first control interface unit, the propagation delay from said first control interface unit to said first radio head over said first bus.

17. The method of claim 15 further comprising subsequently:

changing the physical configuration of said system;

thereafter, re-determining the propagation delay from said first control interface unit to said first radio head over said first control signal bus and re-determining the propagation delay from said second control interface unit to said first radio head over said second control signal bus; and thereafter, re-selecting, by said first radio head, a primary control signal bus from amongst said plurality of control signal busses based on the respective propagation delays between said first radio head and said control interface units.

18. The method of claim 15 wherein determining the propagation delay from said first control interface unit to said first radio head over said first control signal bus comprises determining a first propagation delay from said first control interface unit to said first radio head over said first control signal bus by said first control interface unit.

19. The method of claim 18 wherein said first control interface unit determining said first propagation delay from said first control interface unit to said first radio head over said first control signal bus comprises said first control interface unit determining said first propagation delay by counting hops between said first control interface unit and said first radio head.

20. The method of claim 18 wherein said first control interface unit determining said first propagation delay from said first control interface unit to said first radio head over said first control signal bus comprises said first control interface unit determining said first propagation delay by measuring a ping-response time between said first control interface unit and said first radio head over said first control bus.

21. The method of claim 18 further comprising said first control interface unit communicating said first propagation delay to said first radio head.

22. The method of claim 15 wherein determining the propagation delay from said first control interface unit to said first radio head over said first control signal bus comprises said first control interface unit determining respective propagation delays from said first control interface unit to a plurality of radio heads over said first control signal bus.

23. The method of claim 22 further comprising said first control interface unit communicating said plurality of propagation delays to said first radio head.

24. The method of claim 23 wherein determining the propagation delay from said second control interface unit to said first radio head over said second control signal bus comprises said second control interface unit determining a second propagation delay from said second control interface unit to said first radio head over said second control signal bus, and further comprising said second control interface unit communicating said second propagation delay to said first radio head.

25. A wireless communications system, comprising:
- a plurality of geographically separated radio heads cascaded in a chain;
- at least first and second control interfaces connected to said chain and supplying control information thereto;
- a plurality of virtual control signal busses connecting said control interfaces to said plurality of radio heads, including at least a first virtual control signal bus connecting said first control interface to said plurality of radio heads and a second virtual control signal bus connecting said second control interface to said plurality of radio heads;
- wherein said first control interface is adapted to determine the propagation delay from a said first control interface to a first radio head over said first virtual control signal bus;
- wherein said second control interface is adapted to determine the propagation delay from said second control interface to said first radio head over said second virtual control signal bus; and
- wherein a radio head in said chain is adapted to determine which of said virtual control signal buses is primary based on the respective propagation delays from said control interfaces to said radio head.

26. The system of claim 25 wherein each of said radio heads in said chain is adapted to determine which of said control signal buses is its primary control signal bus based on the respective propagation delays from said control interfaces to itself.

* * * * *